(12) United States Patent
Cosoi (10) Patent No.: US 8,695,100 B1
(45) Date of Patent: Apr. 8, 2014

(54) SYSTEMS AND METHODS FOR ELECTRONIC FRAUD PREVENTION

(75) Inventor: Catalin A. Cosoi, Buzau (RO)

(73) Assignee: Bitdefender IPR Management Ltd., Nicosia (CY)

( * ) Notice: Subject to any disclaimer, the term of this patent is extended or adjusted under 35 U.S.C. 154(b) by 1454 days.

(21) Appl. No.: 11/967,563

(22) Filed: Dec. 31, 2007

(51) Int. Cl.
*H04L 29/06* (2006.01)

(52) U.S. Cl.
USPC .............................. 726/26; 726/22; 713/187

(58) Field of Classification Search
USPC ........................................................... 726/26
See application file for complete search history.

(56) References Cited

U.S. PATENT DOCUMENTS

| | | | |
|---|---|---|---|
| 5,361,353 A | 11/1994 | Carr et al. | |
| 6,023,723 A | 2/2000 | McCormick et al. | |
| 6,052,709 A | 4/2000 | Paul | |
| 6,161,130 A | 12/2000 | Horvitz et al. | |
| 6,421,709 B1 | 7/2002 | McCormick et al. | |
| 6,442,606 B1 | 8/2002 | Subbaroyan | |
| 6,533,822 B2 | 3/2003 | Kupiec | |
| 6,542,635 B1 | 4/2003 | Hu et al. | |
| 6,564,202 B1 | 5/2003 | Schuetze et al. | |
| 6,598,054 B2 | 7/2003 | Schuetze et al. | |
| 6,687,740 B1 | 2/2004 | Gough et al. | |
| 6,701,305 B1 | 3/2004 | Holt et al. | |
| 6,708,205 B2 | 3/2004 | Sheldon et al. | |
| 6,718,368 B1 | 4/2004 | Ayyadurai | |
| 6,772,196 B1 | 8/2004 | Kirsch et al. | |
| 6,941,321 B2 | 9/2005 | Schuetze et al. | |
| 6,963,869 B2 | 11/2005 | Burrows | |
| 7,076,527 B2 | 7/2006 | Bellegarda et al. | |
| 7,178,099 B2 | 2/2007 | Meyer et al. | |
| 7,519,565 B2 | 4/2009 | Prakash et al. | |
| 7,555,523 B1 | 6/2009 | Hartmann | |
| 7,577,656 B2 | 8/2009 | Kawai et al. | |
| 7,751,620 B1 | 7/2010 | Cosoi | |
| 7,945,627 B1 | 5/2011 | Musat | |
| 8,010,614 B1 | 8/2011 | Musat et al. | |
| 2002/0078349 A1 | 6/2002 | Marso et al. | |
| 2003/0041126 A1 | 2/2003 | Buford et al. | |
| 2003/0135555 A1 | 7/2003 | Birrel et al. | |
| 2004/0064442 A1* | 4/2004 | Popovitch | 707/3 |
| 2004/0167968 A1 | 8/2004 | Wilson et al. | |

(Continued)

OTHER PUBLICATIONS

Medvet et al., "Visual-Similarity-Based Phishing Detection", Sep. 2008, 6 pgs.*

(Continued)

*Primary Examiner* — Taghi Arani
*Assistant Examiner* — Thaddeus Plecha
(74) *Attorney, Agent, or Firm* — Law Office of Andrei D Popovici, PC (57) ABSTRACT

In some embodiments, a phishing detection method includes computing a first phishing indicator of a target webpage; when the target webpage is considered suspicious of phishing according to the first phishing indicator, computing a second phishing indicator of the target webpage, and deciding whether the webpage is a phishing site according to the first and second phishing indicators. Computing the second phishing indicator comprises comparing a word content (semantic content) of the target webpage to a word content of each of a plurality of reference webpages. Comparing the word contents may include counting the number of visible words which are common to the target and reference webpages, and/or computing a ratio of a number of words which are common to the target and reference webpages to the total number of words in both the target and reference webpages.

16 Claims, 6 Drawing Sheets

(56) References Cited

U.S. PATENT DOCUMENTS

| | | |
|---|---|---|
| 2004/0199594 A1 | 10/2004 | Radatti et al. |
| 2004/0221012 A1 | 11/2004 | Heumesser |
| 2005/0144241 A1 | 6/2005 | Stata et al. |
| 2005/0193073 A1 | 9/2005 | Mehr et al. |
| 2005/0198166 A1 | 9/2005 | Kawaji |
| 2005/0262209 A1 | 11/2005 | Yu |
| 2006/0010217 A1 | 1/2006 | Sood |
| 2006/0031319 A1 | 2/2006 | Nelson et al. |
| 2006/0069697 A1 | 3/2006 | Shraim |
| 2006/0239430 A1 | 10/2006 | Gue |
| 2006/0253446 A1* | 11/2006 | Leong et al. ............... 707/9 |
| 2006/0294052 A1* | 12/2006 | Kulkarni et al. ............ 707/1 |
| 2007/0019864 A1* | 1/2007 | Koyama et al. ........... 382/218 |
| 2007/0022202 A1 | 1/2007 | Finkle |
| 2007/0061402 A1 | 3/2007 | Mehr et al. |
| 2007/0094500 A1* | 4/2007 | Shannon et al. .......... 713/170 |
| 2007/0118898 A1 | 5/2007 | Morgan |
| 2007/0130262 A1 | 6/2007 | Williams et al. |
| 2007/0136806 A1 | 6/2007 | Berman |
| 2007/0192855 A1 | 8/2007 | Hulten |
| 2007/0233643 A1 | 10/2007 | Kang |
| 2007/0255792 A1 | 11/2007 | Gronberg |
| 2008/0046738 A1* | 2/2008 | Galloway et al. ......... 713/176 |
| 2008/0115214 A1* | 5/2008 | Rowley ........................ 726/22 |
| 2008/0168144 A1 | 7/2008 | Lee |
| 2008/0215692 A1 | 9/2008 | Bosarge et al. |
| 2009/0132571 A1* | 5/2009 | Manasse et al. ......... 707/102 |
| 2009/0164598 A1 | 6/2009 | Nelson et al. |

OTHER PUBLICATIONS

Wenyin, L. et al., Detection of Phishing Webpages based on Visual Similarity, May 10, 2005, p. 1060-1061, Chiba, Japan.

Cosoi, U.S. Appl. No. 11/497,662, filed Aug. 1, 2006, "Adaptive Spam Filtering Systems and Methods".

Cosoi, U.S. Appl. No. 11/867,547, filed Oct. 4, 2007, "Systems and Methods for Dynamically Integrating Heterogeneous Anti-Spam Filters".

Cosoi, U.S. Appl. No. 12/130,630, filed May 30, 2008, "Spam Filtering using Feature Relevance Assignment in Neural Networks".

USPTO, Office Action mailed Jul. 23, 2009 for U.S. Appl. No. 11/536,370, filed Sep. 28, 2006, now US Patent No. 7,945,627.

USPTO, Office Action mailed Mar. 4, 2010 for U.S. Appl. No. 11/536,370, filed Sep. 28, 2006, now US Patent No. 7,945,627.

USPTO, Office Action mailed Sep. 15, 2010 for U.S. Appl. No. 11/536,370, filed Sep. 28, 2006, now US Patent No. 7,945,627.

Dulucq, S. et al., "Analysis of Tree Edit Distance Algorithms," Combinatorial Pattern Matching: 14th Annual Symposium, CPM 2003, Morelia, Michoacán, Mexico, Jun. 25-27, 2003, Proceedings; Lecture Notes in Computer Science, Springer Berlin/Heidelberg, vol. 2676/2003, p. 83-95.

Mao, S. et al., "Logical Entity Recognition in Multi-Style Document Page Images," Proceedings of the 18th International Conference on Pattern Recognition (ICPR'06)—vol. 01, Aug. 20-24, 2006, IEEE Computer Society, Washington, DC, USA, p. 876-879.

* cited by examiner

SYSTEMS AND METHODS FOR ELECTRONIC FRAUD PREVENTION

BACKGROUND

The invention relates to methods and systems for classifying electronic documents, and in particular to systems and methods for detecting fraudulent webpages.

Internet fraud, especially in the form of phishing and identity theft, has been posing an increasing threat to internet users worldwide. Sensitive identity information and credit card details obtained fraudulently by international criminal networks operating on the internet are used to fund various online transactions, and/or are further sold to third parties. Besides direct financial damage to individuals, internet fraud also causes a range on unwanted side effects, such as increased security costs for companies, higher retail prices and banking fees, declining stock values, lower wages and decreased tax revenue.

In an exemplary phishing attempt, a fake website (also termed a clone) may pose as a genuine webpage belonging to an online retailer or a financial institution, asking the user to enter some personal information (e.g., username, password) and/or financial information (e.g. credit card number, account number, security code). Once the information is submitted by the unsuspecting user, it may be harvested by the fake website. Additionally, the user may be directed to another webpage which may install malicious software on the user's computer. The malicious software (e.g., viruses, Trojans) may continue to steal personal information by recording the keys pressed by the user while visiting certain webpages, and may transform the user's computer into a platform for launching other phishing or spam attacks.

Software running on an Internet user's computer system may be used to identify fraudulent web documents and to warn the user of a possible phishing threat. Several approaches have been proposed for identifying a clone webpage. These strategies include matching the webpage's internet address to lists of known phishing or trusted addresses (techniques termed black- and white-listing, respectively). Phishers often change the locations of their websites frequently, which limits the effectiveness of black-listing.

In the article "Detection of Phishing Webpages based on Visual Similarity," WWW 2005, May 10-14, 2005, Chiba, Japan, published by the Association for Computing Machinery (ACM), Wenyin et al. describe an approach to detecting phishing websites based on visual similarity. The approach can be used to search for suspicious webpages which are visually similar to true webpages. The approach uses three metrics: block level similarity, layout similarity, and overall style similarity. A webpage is first decomposed into a set of salient blocks. The block level similarity is defined as the weighted average of the similarities of all pairs of matched blocks. The layout similarity is defined as the ratio of the weighted number of matched blocks to the total number of blocks in the true webpage. The overall style similarity is calculated based on the histogram of the style feature. The normalized correlation coefficient of the two webpages' histograms is the overall style similarity.

SUMMARY

According to one aspect, a method comprises computing a preliminary phishing indicator of a target webpage; when the target webpage is considered suspicious of phishing according to the preliminary phishing indicator, computing a word content phishing indicator of the target webpage, wherein computing the word content phishing indicator comprises comparing a word content of the target webpage to a word content of each of a plurality of reference webpages, and making a determination whether the target webpage is a phishing page according to the word content phishing indicator.

According to another aspect, a system comprises a word content phishing filter configured to compute a word content phishing indicator of a target webpage, wherein computing the word content phishing indicator comprises comparing a word content of the target webpage to a word content of each of a plurality of reference webpages, and a phishing risk manager configured to determine whether the target webpage is a phishing page according to the word content phishing indicator.

According to another aspect, a method comprises computing a first fraud indicator of a target document; when the target document is considered suspicious of fraud according to the first fraud indicator, computing a second fraud indicator of the target document, wherein computing the second fraud indicator comprises comparing a word content of the target document to a word content of each of a plurality of reference documents, and making a determination whether the target document is fraudulent according to the second fraud indicator.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Analyzing the word content of a document refers to analyzing the meaning of the words in the document (i.e. the sequence of characters in each word, which defines the semantic content of the document), as distinct from merely analyzing the appearance of words in the document. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
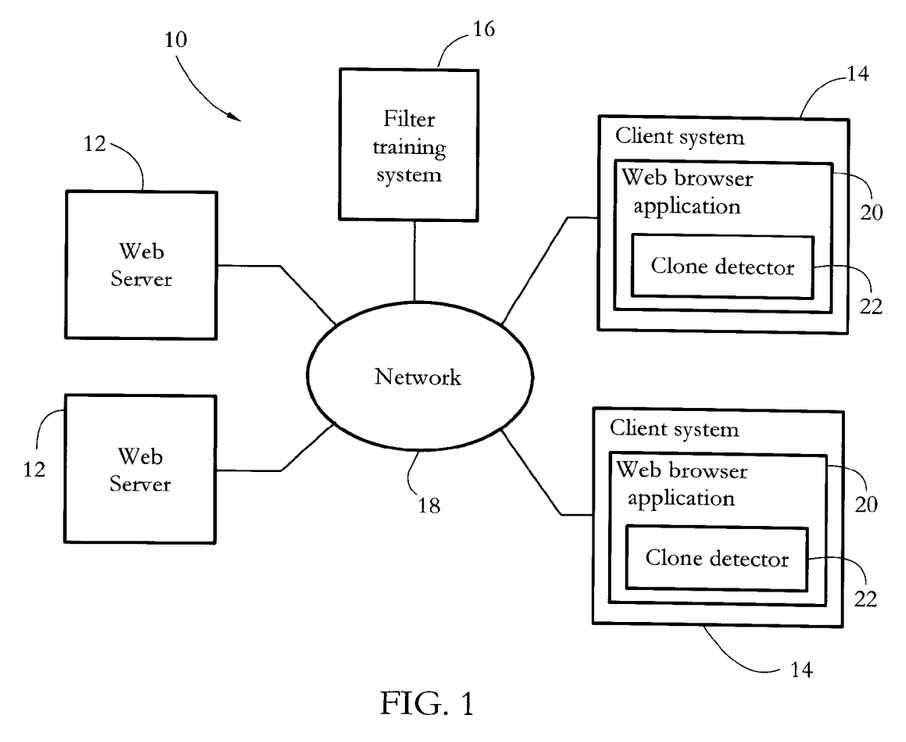
FIG. 1 shows an exemplary online fraud prevention system including multiple client systems each having a web browser software application and a clone detector forming part of the web browser application, according to some embodiments of the present invention.

FIG. 1 shows an exemplary online fraud prevention system according to some embodiments of the present invention. System 10 includes a plurality of web servers 12, a filter training system 16, and a plurality of client systems 14. Client systems 14 may be computer systems, mobile telephones, personal digital assistants (PDA), or other electronic systems. For clarity, the following discussion will focus on client systems 14 which are computer systems. Filter training system 16 may include one or more computer systems. A network 18 connects web servers 12, client systems 14, and filter training system 16. Network 18 may be a wide-area network such as the Internet, while parts of network 18 may also include a local area network (LAN). In some embodiments, each client system 14 includes a web browser application 20, which may be a computer program used to remotely access data stored on web servers 12.

When a user accesses a webpage (termed target webpage in the following discussion) stored on one of web servers 12, data associated to the target webpage circulates on parts of network 18 between web server 12 and the user's client system 14. Web browser application 20 residing on client system 14 receives the target website data, translates it into visual form and displays it to the user, allowing the user to interact with the target webpage's content.

In some embodiments, web browser application 20 includes a clone detector 22, which may be a computer program. In some embodiments, clone detector 22 may determine whether the target webpage is a clone of a legitimate webpage (i.e. the target webpage replicates the visual/semantic characteristics of the legitimate webpage, but resides at a different location). If a clone is detected, some embodiments of clone detector 22 may block the display of the target webpage by web browser application 20 and/or issue a phishing warning to the user. Clone detector 22 may be a stand-alone software application, or may be a module of a security suite having antivirus, firewall, anti-spam, and other modules. Clone detector 22 may be integrated with web browser application 22 in the form of a browser plug-in, a browser add-on, or a toolbar. In some embodiments, the operation of clone detector 22 may be turned on and off by a user.

Figure 2:
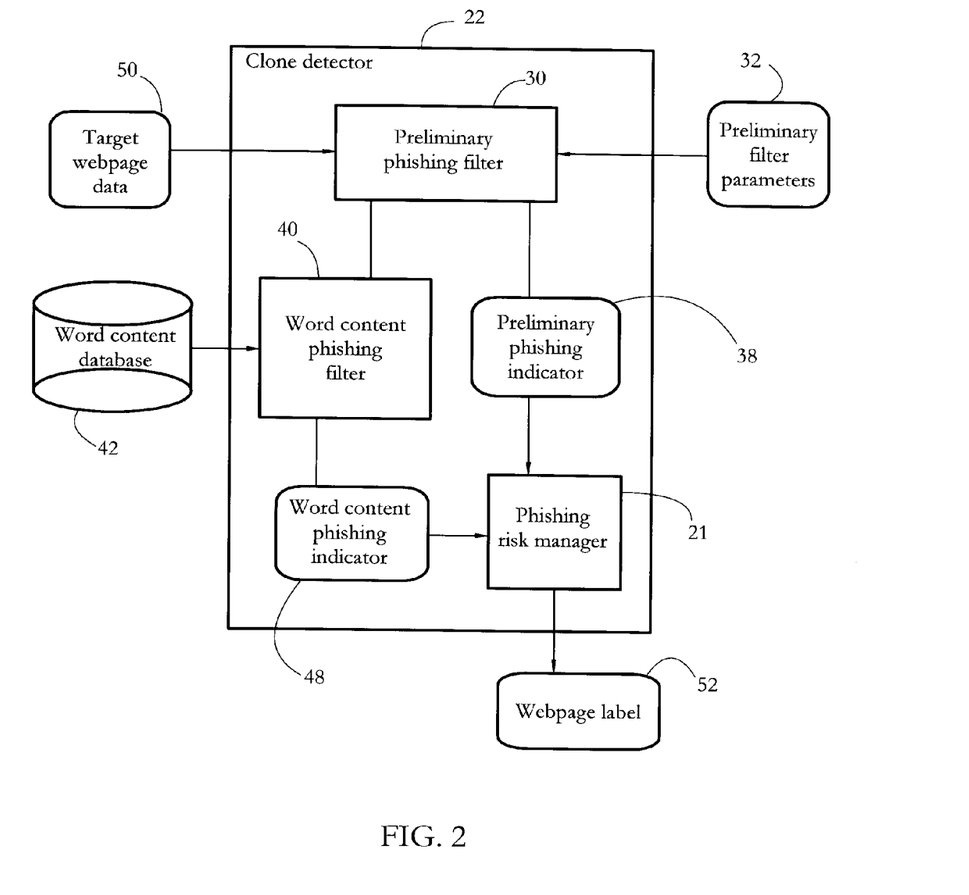
FIG. 2 shows an exemplary structure of a clone detector of the system in FIG. 1 according to some embodiments of the present invention.

FIG. 2 shows an exemplary structural diagram of a clone detector 22 according to some embodiments of the present invention. Clone detector 22 comprises a preliminary phishing filter 30, a word content phishing filter 40, and a phishing risk manager 21 connected to preliminary phishing filter 30 and word content phishing filter 40. Clone detector 22 receives a set of target webpage data 50 and outputs a webpage label 52. In some embodiments, target webpage data may include a location indicator of the target webpage (e.g. IP address and/or URL), and an encoding of the target webpage's content and visual formatting (e.g. HTML and/or XML code). In some embodiments, webpage label 52 may indicate the association of the target webpage with one of a plurality of webpage classes (e.g. "safe" or "phishing").

In some embodiments, preliminary phishing filter 30 receives target webpage data 50 and a set of preliminary filter parameters 32, and produces a set of preliminary phishing indicators 38 of the target webpage, which are forwarded on to phishing risk manager 21. In some embodiments, preliminary phishing indicators 38 may have binary values (e.g. 1 or 0, yes or no), or continuous values between 0 and 1, indicating e.g. the probability that the target webpage is a phishing site according to preliminary phishing filter 30. Preliminary filter parameters 32 may comprise sets of data determining the functional details of preliminary phishing filter 30. For example, preliminary filter parameters 32 may include a list of location indicators (e.g. IP addresses or URL's) of trusted and/or fraudulent webpages, a list of names or financial institution acronyms, and/or a list of keywords. In some embodiments, filter parameters 32 may be determined through a filter optimization process which may occur on client system 14, with or without the assistance of a user. In some embodiments, remotely optimized filter parameters 32 may be downloaded by users via periodic or on-demand software updates over network 18 (FIG. 1).

In some embodiments, word content phishing filter 40 receives target webpage data 50 and a word content database 42 and produces a word content phishing indicator 48, which is forwarded on to phishing risk manager 21. The operation of filter 40 will be described in detail below.

In some embodiments, phishing risk manager 21 receives preliminary phishing indicators 38 and word content phishing indicator 48 and produces webpage label 52. Phishing risk manager 21 may also control the order of operations performed by clone detector 22, as seen in FIG. 3.

Figure 3:
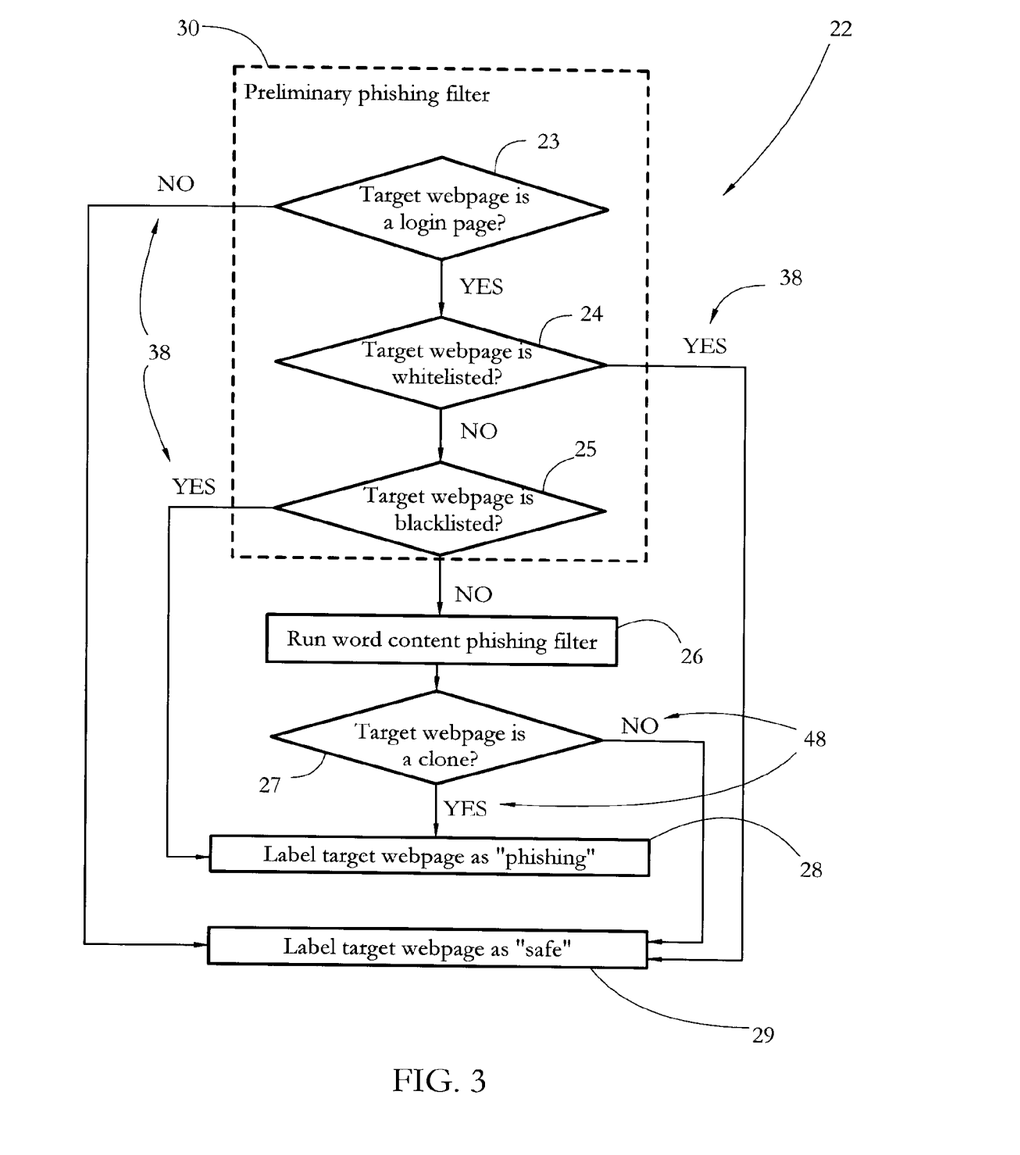
FIG. 3 illustrates the operation of an exemplary clone detector according to some embodiments of the present invention.

FIG. 3 illustrates an exemplary operation of clone detector 22, according to some embodiments of the present invention. In a step 23, preliminary phishing filter 30 receives target webpage data 50 and runs a set of heuristic tests to determine whether the target webpage is a user authentication (login) page. An exemplary step 23 may comprise determining whether the target webpage contains a form field, and/or checking whether the target webpage contains any of a plurality of user authentication keywords (e.g. "username", "password", names and/or acronyms of financial institutions). If the target webpage is not considered to be a login page according to preliminary phishing filter 30, phishing risk manager 21 directs the operation of clone detector 22 to progress to a step 29. If the target webpage is a login page, then in a step 24 preliminary phishing filter 30 checks whether the location indicator (e.g., URL) of the target webpage is contained in a whitelist of location indicators of trusted login pages. If the target webpage is in the whitelist, phishing risk manager 21 directs the operation of clone detector 22 to a step 28. If no, in a step 25 preliminary phishing filter 30 checks whether the location indicator of the target webpage is contained in a blacklist of location indicators of known phishing sites. If the target webpage is in the blacklist, phishing risk manager 21 calls for the execution of step 28. If no, in a step 26 phishing risk manager 21 may invoke word content phishing filter 40. In some embodiments, the execution of steps 23-24-25 may use preliminary filter parameters 32. Parameters 32 (e.g., whitelist, blacklist, lists of keywords and/or acronyms), may be maintained and/or optimized on filter training system 16 and may be transferred to client systems 14 by periodic or on-demand software updates over network 18 (FIG. 1). In some embodiments, the order of steps 23-24-25 may be different from the one illustrated in FIG. 3.

In a step 27 (FIG. 3), word content phishing filter 40 determines whether the target webpage is a clone of a genuine webpage, as described in detail below. If yes, in step 28 phishing risk manager 21 may label the target webpage as "phishing." If no, in step 29 phishing risk manager 21 may generate the webpage label "safe." In some embodiments, clone detector 22 may then pass the corresponding webpage label 52 on to web browser application 20.

Figure 4:
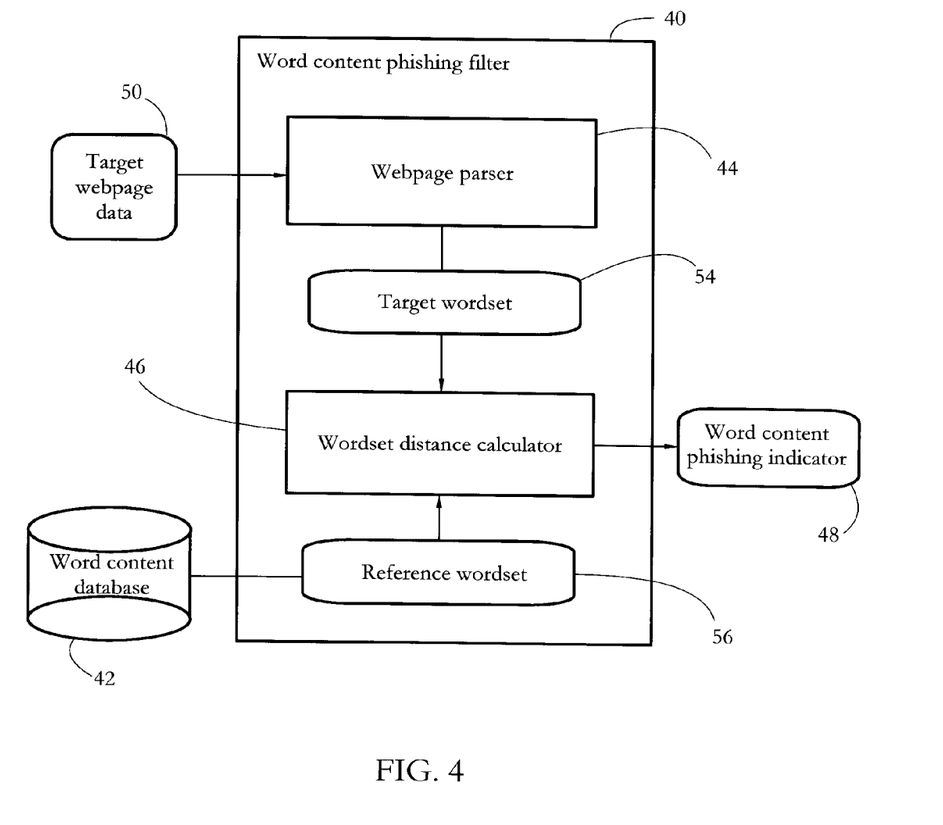
FIG. 4 shows an exemplary diagram of a word content phishing filter forming part of the clone detector of FIG. 2, according to some embodiments of the present invention.

FIG. 4 shows an exemplary structural diagram of word content phishing filter 40. In some embodiments, word content phishing filter 40 determines whether the target webpage is a clone of a genuine webpage by analyzing the word content (semantic content) of the target webpage. The word content of the target page characterizes the meaning of the words (e.g. the sequence of letters in each word), and is distinct from the visual appearance of the words (e.g. graphic layout, color, font, font style and/or size of the words) in the target webpage. Word content phishing filter 40 comprises a webpage parser 44 and a wordset distance calculator 46 connected to webpage parser 44.

In some embodiments, webpage parser 44 receives target webpage data 50 and outputs a target wordset 54 to wordset distance calculator 46. In some embodiments, target wordset 54 may comprise substantially all words within the target webpage which are visible to the user. In some embodiments, target wordset 54 may comprise substantially all visible words within a text passage or text section of the target webpage. In some embodiments, the relevant text section may be a user authentication section, which includes user authentication fields (e.g. username and password fields) and text that is physically proximate to the user authentication fields and is viewed by user in association with the user authentication fields. In some embodiments, for example for a relatively short target webpage, the user authentication section may coincide with the entire target webpage. In some embodiments, for example in embodiments in which user authentication fields are followed by a long text or other content section (e.g. a newsletter), the user authentication section may include only part of a document. In some embodiments, target wordset 54 may comprise the set of N initial words (e.g., first 1,000 or 5,000 words) displayed on the target webpage.

To extract target wordset 54, webpage parser 44 may process target webpage data 50 in ways which include removing header information, breaking target webpage data into multiple sections, removing computer code (e.g. HTML and/or XML tags), and removing visual formatting commands. Some embodiments of webpage parser 44 may execute or interpret sections of computer code associated with target webpage data 50 (e.g. JavaScript commands), and/or may access remote files over network 18. Some embodiments of webpage parser 44 may use commands and/or subroutines and/or components belonging to web browser application 22 to interpret target webpage data 50. In some embodiments, webpage parser 44 may discard a subset of target wordset 54 (for example, common high-occurrence words such as "the").

Figure 5:
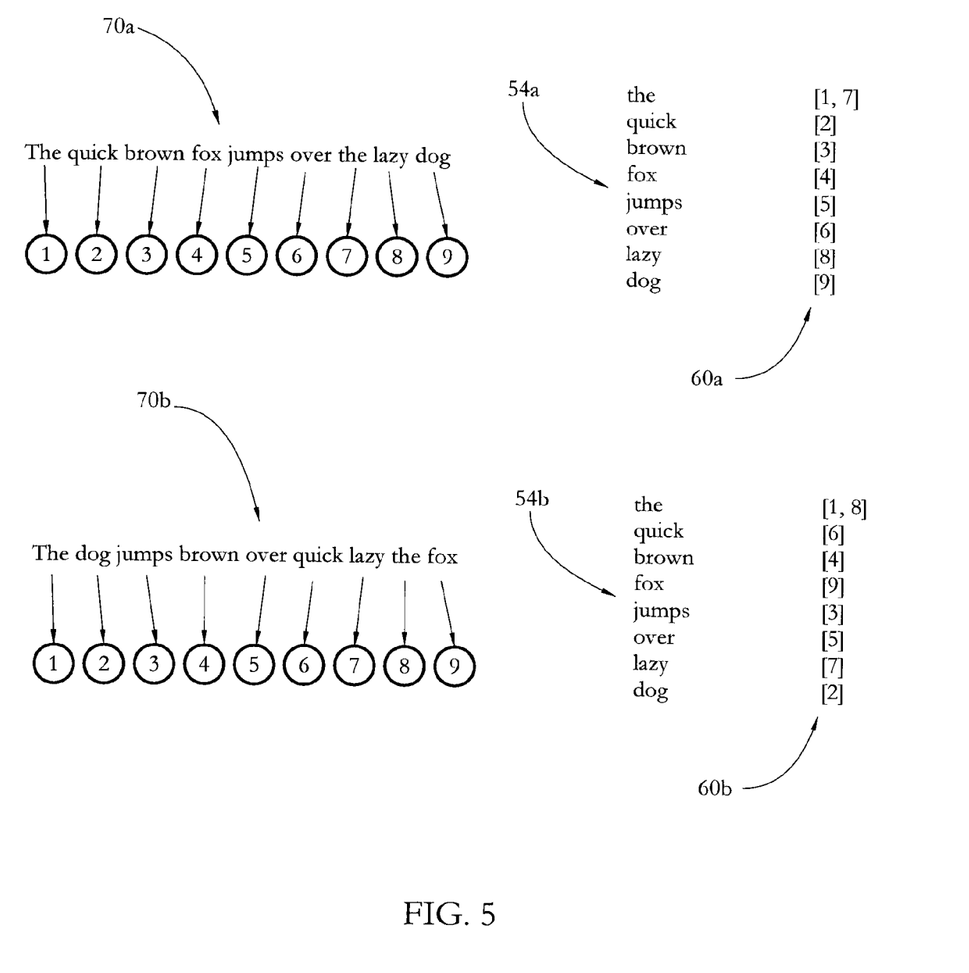
FIG. 5 illustrates a pair of exemplary wordsets and their corresponding sets of position indices according to some embodiments of the present invention.

In addition to extracting target wordset 54, some embodiments of webpage parser 44 may compute a set of position indices associated with target wordset 54. In some embodiments, a position index of a word may indicate its position relative to other words within the respective wordset (in a simple embodiment, the position index may be the actual position of the word within a text section). FIG. 5 shows two exemplary text sections 70a-b, a pair of wordsets 54a-b corresponding to text sections 70a-b, and the sets of position indices 60a-b associated with wordsets 54a-b, respectively. In the example in FIG. 5, wordsets 54a and 54b are identical (i.e. contain the same words), while the respective text sections 70a-b and position indices 60a-b differ. Words occurring more than once in a text section may have more than one position index (e.g., "the" in FIG. 5).

In some embodiments, word distance calculator 46 produces word content phishing indicator 48 according to a comparison between target wordset 54 and each of a set of reference wordsets 56. In some embodiments, each reference wordset 56 may comprise substantially all visible words within a reference webpage, or the set of N initial words (e.g., the first 1,000 or 5,000 words) displayed on a reference webpage. The set of reference wordsets 56 may be stored in word content database 42. In some embodiments, word content database 42 may reside on computer readable media forming part of filter training system 16 (FIG. 1). Copies of word content database 42 may be stored on client systems 14, and may be updated by periodic or on demand software downloads over network 18.

In some embodiments, word distance calculator 46 may compute word content phishing indicator 48 according to the number of words which are common to the target wordset 54 and reference wordset 56. For example, word content indicator 48 may be computed according to an inter-page distance given by the formula:

$$D_1 = 1 - \frac{|A \cap B|}{|A \cup B|}, \qquad [1]$$

wherein A represents target wordset 54, B represents reference wordset 56, $\cap$ and $\cup$ represent set intersection and union, respectively, and wherein |.| denotes number of elements. In formula [1], $D_1$ is close to 1 if target wordset 54 and reference wordset 56 share only a few common words, and $D_1$ approaches 0 if wordsets 54 and 56 are substantially the same (e.g. $D_1=0$ for the two exemplary wordsets in FIG. 5).

In some embodiments, word distance calculator 46 may compute word content indicator 48 according to an inter-page distance:

$$D_2 = 1 - \frac{|\Delta_1|}{|A \cup B|}, \qquad [2]$$

wherein $\Delta_1 = \{w \in A \cap B$, so that $\alpha - \epsilon \leq x_w/y_w \leq \alpha + \epsilon\}$, wherein w represents a word, A represents target wordset 54, B represents reference wordset 56, $\cap$ and $\cup$ represent set intersection and union, respectively, |.| denotes number of elements, $x_w$ represents a position index of the word w within target wordset 54, $y_w$ represents a position index of the word w within reference wordset 56, and wherein $\alpha$ and $\epsilon$ are parameters. In formula [2], $D_2$ is close to 0 if target wordset 54 and reference wordset 56 share a large number of words in the same order of appearance, and is close to 1 if wordsets 54 and 56 have few common words and/or the words appear in a different order in the target and reference webpages, respectively (e.g., $D_2 \approx 1$ for the exemplary pair of wordsets in FIG. 5). In some embodiments, $\alpha \approx 1$ if a word appears in both the target and reference webpages in similar positions. Since different words may appear at different positions within the target and reference webpages, a set of distinct α values may occur while computing the set $\Delta_1$, in which case evaluating the inter-page distance $D_2$ may comprise counting the words which correspond to the most frequent α value. In some embodiments, parameter ϵ may represent a tolerance range associated to the set of position indices of the target and reference wordsets. For example, a value ϵ=0.05 may signify that a position index mismatch occurring in up to 5% of words may result in the target and reference wordsets being considered identical. In some embodiments, parameter ϵ may have a predefined value, determined according to a desired number of false positive and/or false negative webpage classifications over a training corpus of webpages (for example, a value ϵ=0.05 may be used in some embodiments).

In some embodiments, word distance calculator 46 may compute word content indicator 48 according to an inter-page distance:

$$D_3 = 1 - \frac{|\Delta_2|}{|A \cup B|}, \quad [3]$$

wherein $\Delta_2=\{w \in A \cap B, \text{ so that } \beta-\delta \leq x_w - y_w \leq \beta+\delta\}$, wherein w represents a word, A represents the target wordset, B represents the reference wordset, ∩ and ∪ represent set intersection and union, respectively, |.| denotes number of elements, $x_w$ represents a first position index of the word w within the target wordset, $y_w$ represents a second position index of the word w within the reference wordset, and wherein β and δ are parameters. In formula [3], $D_3$ is close to 0 if wordsets 54 and 56 share a large number of words in the same order of appearance, and is close to 1 if wordsets 54 and 56 have few common words and/or the words appear in a different order in the target and reference webpages, respectively (e.g. $D_3 \approx 1$ for the exemplary pair of wordsets in FIG. 5). Formula [3] differs from formula [2] in that it may produce a value $D_3 \approx 0$ not only if the target and reference wordsets are identical (identical position indices), but also if the target and reference wordsets are shifted by β±δ words. In some embodiments, evaluating the inter-page distance $D_3$ may comprise counting the words which correspond to the most frequent β value. In some embodiments, parameter δ may have a predefined value, determined according to a desired number of false positive and/or false negative webpage classifications over a training corpus of webpages (e.g., computer experiments of the present method have used a value δ=5).

In some embodiments, word content phishing filter 40 may produce a word content phishing indicator 48 indicating that the target webpage is a clone of a particular reference webpage if the respective inter-page distance is lower than a predefined threshold (e.g., $D_1 < 0.35$ or $D_2 < 0.35$ or $D_3 < 0.35$, meaning that, on average, the target webpage and reference webpage share 65% of the word content). Threshold values may be determined according to a desired number of false positive and/or false negative webpage classifications over a training corpus containing both genuine and clone webpages.

Figure 6:
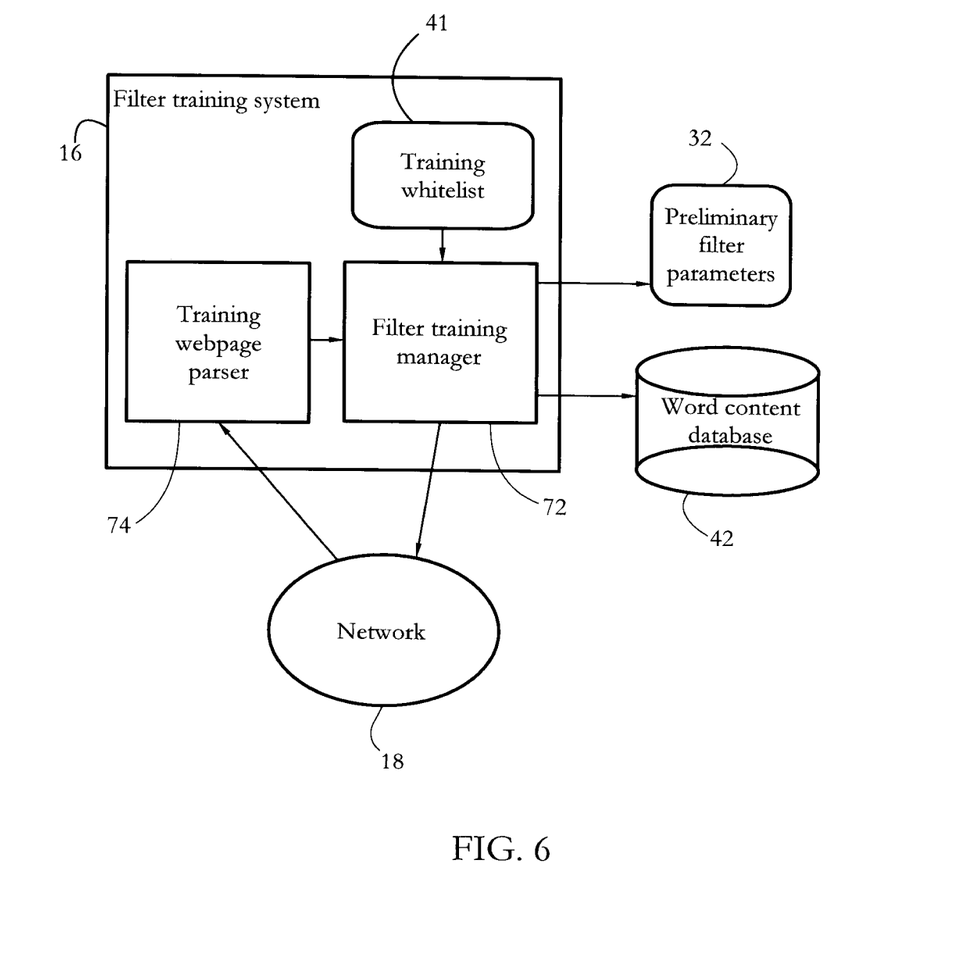
FIG. 6 shows an exemplary diagram of a filter training system of FIG. 1 according to some embodiments of the present invention.

FIG. 6 shows an exemplary diagram of a filter training system of FIG. 1 according to some embodiments of the present invention. Filter training system 16 may be a computer system and may comprise a training webpage parser 74 and a filter training manager 76 connected to webpage parser 74. Filter training system 16 analyzes a training set of webpages over network 18 and produces word content database 42 and preliminary filter parameters 32. In some embodiments, word content database 42 may include reference wordsets 56 and corresponding position indices computed for each of a plurality of reference webpages, comprising genuine login pages of online retailers, online payment services, banks, and/or other financial institutions. In some embodiments, word content database 42 comprises a data structure which includes a set of words, a vector of location indicators of reference webpages containing each word, and a vector of word position indices corresponding to the respective word and respective reference webpage.

In some embodiments, filter training manager 76 may maintain a training whitelist 41 of webpage location indicators (e.g. IP address and/or URL) corresponding to authentic login pages of trusted financial institutions. Training whitelist 41 may be updated to include newly discovered webpages. For each location indicator in training whitelist 41, filter training system 16 may retrieve the respective webpage over network 18.

In some embodiments, training webpage parser 74 may receive webpage data and output a corresponding wordset and word position indices to filter training manager 76. In some embodiments, the operation of training webpage parser 74 may be identical to the operation of webpage parser 44 (FIG. 4).

Filter training manager 76 may aggregate the wordsets and word position indices corresponding to all webpages in training whitelist 41 into word content database 42. Additionally, filter training manager 76 may maintain and/or optimize preliminary filter parameters 32. Filter training system 16 may make word content database 42 and preliminary filter parameters 32 available for download to client systems 14 over network 18.

The exemplary systems and methods described above allow an online fraud prevention system to determine whether a webpage visited by a user is a possible phishing page by determining whether it is a clone of a genuine webpage. In case a clone is detected (a webpage having the same word content characteristics as the genuine webpage but residing at a different location), the system may block the display of the suspicious webpage and/or issue a phishing warning to the user.

A review of a sample of customer login webpages belonging to financial institutions, online retailers, and online pay services revealed that a significant proportion exhibit similarities in word content. The present methods and systems may allow clone detection using a comparison of word content between webpages. Such a comparison of word content may be used in place of or in conjunction with a comparison of the visual appearance of the words (color, font, font size, font face), or a comparison of graphic layout (e.g. relative positions of text and images). In some embodiments, processing a word content database may require less computing resources than storing and assembly of a corresponding page layout database. The present systems and methods may provide an effective and computationally efficient solution for clone detection.

Alternative embodiments of the systems and methods described above may be used to prevent electronic fraud in the case of documents other than webpages.

It will be clear to one skilled in the art that the above embodiments may be altered in many ways without departing from the scope of the invention. Accordingly, the scope of the invention should be determined by the following claims and their legal equivalents.

What is claimed is:

1. A computer-implemented method comprising employing at least one computer processor to perform the steps of:
    generating a target sequence of target word indexes for a set of visible words of a target webpage, wherein the target word indexes are ordered in the target sequence according to a display order of visible words in the target webpage;

computing a word content phishing indicator for the target webpage by determining a relationship between an index of a word within the target sequence of target word indexes and an index of the word within a reference sequence of reference word indexes, wherein the reference word indexes are ordered in the reference sequence according to a display order of visible words in a reference webpage, wherein the word content phishing indicator for the target webpage is computed according to a quantity selected from a group consisting of a first inter-page word distance and a second inter-page word distance, wherein the first inter-page distance is computed as a function of $$\frac{|\Delta_1|}{|A \cup B|},$$

wherein the second inter-page word distance is computed as a function of $$\frac{|\Delta_2|}{|A \cup B|},$$

wherein $\Delta_1 = \{w \in A \cap B,$ so that $\alpha - \epsilon \le x_w/y_w \le \alpha + \epsilon\}$, wherein $\Delta_2 = \{w \in A \cap B,$ so that $\alpha - \epsilon \le x_w/y_w \le \alpha + \epsilon\}$, wherein w represents a word w, A represents a target wordset of the target webpage, B represents a reference wordset of the reference webpage, $\cap$ and $\cup$ represent set intersection and union, respectively, |.| denotes number of elements, $x_w$ represents an index of the word w within the target wordset, $y_w$ represents an index of the word w within the reference wordset, and wherein $\alpha$ and $\epsilon$ are non-zero parameters; and making a determination whether the target webpage is a phishing page according to the word content phishing indicator.

2. The method of claim 1, further comprising computing a preliminary phishing indicator for the target webpage, and computing the word content phishing indicator for the target webpage in response to computing the preliminary phishing indicator for the target webpage when the target webpage is considered suspicious of phishing according to the preliminary phishing indicator, wherein computing the preliminary phishing indicator includes comparing a location indicator of the target webpage to a reference list of location indicators.

3. The method of claim 2, wherein the reference list of location indicators includes a whitelist of location indicators corresponding to trusted webpages.

4. The method of claim 2, wherein the reference list of location indicators includes a blacklist of location indicators corresponding to phishing webpages.

5. The method of claim 1, further comprising computing a preliminary phishing indicator for the target webpage, and computing the word content phishing indicator for the target webpage in response to computing the preliminary phishing indicator for the target webpage when the target webpage is considered suspicious of phishing according to the preliminary phishing indicator, wherein computing the preliminary phishing indicator includes determining whether the target webpage includes a user authentication request.

6. The method of claim 1, further comprising identifying a user authentication word sequence formed by all visible words in a user authentication section of the target webpage, wherein the target sequence of target word indexes comprises a target sequence of user authentication word indexes ordered according to a display order of visible words in the user authentication section of the target webpage.

7. The method of claim 1, wherein the word content phishing indicator for the target webpage is computed according to the first inter-page word distance.

8. The method of claim 1, wherein the word content phishing indicator for the target webpage is computed according to the second inter-page word distance.

9. A system comprising a hardware computer processor configured to execute a set of instructions to form:

a word content phishing filter configured to compute a word content phishing indicator for a target webpage, wherein computing the word content phishing indicator for the target webpage comprises determining a relationship between an index of a word within a target sequence of target word indexes and an index of the word within a reference sequence of reference word indexes, wherein the target word indexes are ordered in the target sequence according to a display order of visible words in the target webpage, and wherein the reference word indexes are ordered in the reference sequence according to a display order of visible words in a reference webpage, wherein the word content fishing indicator for the target webpage is computed according to a quantity selected from a group consisting of a first inter-page word distance and a second inter-page word distance, wherein the first inter-page distance is computed as a function of $|\Delta_1|/|A \cup B|$, wherein the second inter-page word distance is computed as a function of $|\Delta_2|/|A \cup B|$, wherein $\Delta_1 = \{w \in A \cap B,$ so that $\alpha - \epsilon \le x_w/y_w \le \alpha + \epsilon\}$, wherein $\Delta_2 = \{w \in A \cap B,$ so that $\alpha - \epsilon \le x_w - y_w \le \alpha + \epsilon\}$, wherein w represents a word w, A represents a target wordset of the target webpage, B represents a reference wordset of the reference webpage, $\cap$ and $\cup$ represent set intersection and union, respectively, |.| denotes number of elements, $x_w$ represents an index of the word w within the target wordset, $y_w$ represents an index of the word w within the reference wordset, and wherein $\alpha$ and $\epsilon$ are non-zero parameters; and a phishing risk manager configured to determine whether the target webpage is a phishing page according to the word content phishing indicator.

10. The system of claim 9, wherein computing the word content phishing indicator comprises identifying a user authentication word sequence formed by all visible words in a user authentication section of the target webpage, wherein the target sequence of target word indexes comprises a target sequence of user authentication word indexes ordered according to a display order of visible words in the user authentication section of the target webpage.

11. The system of claim 9, wherein the word content phishing indicator for the target webpage is computed according to the first inter-page word distance.

12. The system of claim 9, wherein the word content phishing indicator for the target webpage is computed according to the second inter-page word distance.

13. A computer-implemented method comprising employing at least one computer processor to perform the steps of:

generating a target sequence of target word indexes for a set of visible words of the target document, wherein the target word indexes are ordered in the target sequence according to a display order of visible words in the target document;

computing a word content fraud indicator for the target document by determining a relationship between an index of a word within the target sequence of target word indexes and an index of the word within a reference sequence of reference word indexes, wherein the reference word indexes are ordered in the reference sequence according to a display order of visible words in a reference document, wherein the word content fraud indicator for the target webpage is computed according to a quantity selected from a group consisting of a first inter-page word distance and a second inter-page word distance, wherein the first inter-page distance is computed as a function of $$\frac{|\Delta_1|}{|A \cup B|},$$

wherein the second inter-page word distance is computed as a function of $$\frac{|\Delta_2|}{|A \cup B|},$$

wherein $\Delta_1=\{w \in A \cap B,$ so that $\alpha-\epsilon \leq x_w/y_w \leq \alpha+\epsilon\}$, wherein $\Delta_2=\{w \in A \cap B,$ so that $\alpha-\epsilon \leq x_w/y_w \leq \alpha+\epsilon\}$, wherein w represents a word w, A represents a target wordset of the target webpage, B represents a reference wordset of the reference webpage, $\cap$ and $\cup$ represent set intersection and union, respectively, $|.|$ denotes number of elements, $x_w$ represents an index of the word w within the target wordset, $y_w$ represents an index of the word w within the reference wordset, and wherein $\alpha$ and $\epsilon$ are non-zero parameters; and making a determination whether the target document is fraudulent according to the word content fraud indicator.

14. The method of claim 13, further comprising identifying a user authentication word sequence formed by all visible words in a user authentication section of the target document, wherein the target sequence of target word indexes comprises a target sequence of user authentication word indexes ordered according to a display order of visible words in the user authentication section of the target document.

15. The method of claim 13, wherein the word content fraud indicator for the target webpage is computed according to the first inter-page word distance.

16. The method of claim 13, wherein the word content fraud indicator for the target webpage is computed according to the second inter-page word distance.

* * * * *

UNITED STATES PATENT AND TRADEMARK OFFICE
CERTIFICATE OF CORRECTION

PATENT NO.       : 8,695,100 B1                                Page 1 of 1
APPLICATION NO.  : 11/967563
DATED            : April 8, 2014
INVENTOR(S)      : Cosoi It is certified that error appears in the above-identified patent and that said Letters Patent is hereby corrected as shown below:

In the Claims:

Column 9, line 31 (claim 1 line 35), after " $\Delta_2=\{w \in A \cap B, \text{ so that } \alpha-\varepsilon \leq$ ", replace "$x_w/y_w$" with "$x_w-y_w$"

Column 12, line 2 (claim 13 line 26), after " $\Delta_2=\{w \in A \cap B, \text{ so that } \alpha-\varepsilon \leq$ " replace "$x_w/y_w$" with "$x_w-y_w$"

Signed and Sealed this
Tenth Day of June, 2014

Michelle K. Lee
*Deputy Director of the United States Patent and Trademark Office*